United States Patent
George

(10) Patent No.: US 7,330,164 B2
(45) Date of Patent: Feb. 12, 2008

(54) VIDEO CONTROLLED DETECTOR SENSITIVITY

(75) Inventor: John Barrett George, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 536 days.

(21) Appl. No.: 10/648,675

(22) Filed: Aug. 25, 2003

(65) Prior Publication Data
US 2005/0057550 A1    Mar. 17, 2005

(51) Int. Cl.
    H04N 3/223    (2006.01)

(52) U.S. Cl. .............................. 345/7; 345/1.1; 345/20; 345/32; 345/77; 348/744; 353/30; 386/1; 386/31

(58) Field of Classification Search ............... 345/7, 345/8, 9, 13, 20, 1.1, 32, 77; 348/189, 421, 348/744, 748; 353/31, 30; 386/1, 29, 31
See application file for complete search history.

(56) References Cited

U.S. PATENT DOCUMENTS

| | | | | |
|---|---|---|---|---|
| 4,447,774 A | * | 5/1984 | Stalberg | 327/72 |
| 5,040,877 A | * | 8/1991 | Blinc et al. | 349/10 |
| 5,050,994 A | * | 9/1991 | Kipphan et al. | 356/445 |
| 5,465,174 A | * | 11/1995 | Sprotbery | 349/5 |
| 5,892,357 A | * | 4/1999 | Woods et al. | 324/96 |
| 5,936,395 A | * | 8/1999 | Kevorkian et al. | 324/96 |
| 6,285,182 B1 | * | 9/2001 | Blake et al. | 324/96 |
| 6,330,040 B1 | | 12/2001 | Kawashima | |
| 6,392,612 B1 | * | 5/2002 | George | 345/20 |
| 6,560,366 B1 | * | 5/2003 | Wilkins | 382/236 |
| 2003/0156229 A1 | * | 8/2003 | Samman et al. | 348/745 |

OTHER PUBLICATIONS

Dummy half tone image display panel; Fujitsu General LTD; JP 3353555 B2; Pub. Date Dec. 3, 2002.*

* cited by examiner

Primary Examiner—Bipin Shalwala
Assistant Examiner—Vincent E. Kovalick
(74) Attorney, Agent, or Firm—Joseph J. Laks; Frank Y. Liao; Francis A. Davenport

(57) ABSTRACT

A method for setting opto-sensor detection sensitivity in a projection video display comprising the steps of sequentially generating video signals of different colors for illuminating a sensor with video images of the video signals. In responsive to the video signals automatically selecting respective detection thresholds. Sequentially detecting sensor signals in excess of the respective detection thresholds. Coupling the detected sensor signals for automated adjustment of the projection video display.

11 Claims, 2 Drawing Sheets

VIDEO CONTROLLED DETECTOR SENSITIVITY

FIELD OF THE INVENTION

This invention relates to the field of video projection display and in particular to processing raster sensing signals.

BACKGROUND OF THE INVENTION

In a projection video display, geometric raster distortions result from the physical placement of the cathode ray display tubes. Such raster distortions are exacerbated by the use of cathode ray tubes with curved, concave phosphor surfaces and the inherent magnification in the optical projection path. The projected image is composed of three scanning rasters which are required to be in register one with the other on a viewing screen. The precise overlay of the three projected images requires the adjustment of multiple waveforms to compensate for geometrical distortion and facilitate the superimposition of the three projected images. However, manual alignment of multiple waveforms is labor intensive during manufacturing, and without the use of sophisticated test equipment may preclude setup at a user location. An automated convergence system simplifies manufacturing alignment and facilitates user location adjustment by using raster edge measurement at peripheral display screen locations to determine raster size and convergence. Such an automated convergence system relies on sensors, located at screen edge locations, being illuminated by a projected setup marker M. The intensity of illumination at each sensor may vary greatly for a number of reasons as discussed in U.S. Pat. No. 6,392,612 titled Opto Sensor Signal Current Detector which is hereby incorporated by reference. Thus to avoid generating erratic signals from weak or poorly illuminated sensors it is advantageous to apply differing amounts of detection sensitivity in the form of a sensor signal detection threshold. To reduce alignment time an accelerated sequence is required where detection sensitivity differences are controllably selected in accordance with the color of the projected setup marker image

SUMMARY OF THE INVENTION

A method for setting opto-sensor detection sensitivity in a projection video display comprises the steps of sequentially generating video signals of different colors for illuminating a sensor with images of the video signals. Responsive to the video signals respective detection thresholds are automatically selected. Sensor signals in excess of the respective detection thresholds are sequentially detected. The detected sensor signals are coupled for automated adjustment of the projection video display. In a corresponding inventive circuit arrangement, a video signal generated for automated alignment, is coupled to a video amplifier comprising first and second transistors configured as a cascode amplifier and coupled to a display device. A time constant network is coupled to the first and second transistors for developing a control voltage responsive to the video signal. A third transistor is responsive to the control voltage and is switched between conduction and non-conduction responsive to a presence and absence of the video signal.

DETAILED DESCRIPTION

Figure 1:
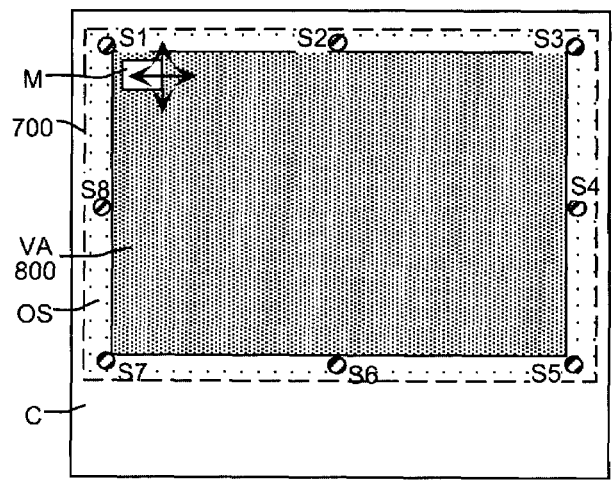
FIG. 1 is a simplified front view of a projection video display.

FIG. 1 illustrates a front view of a video projection display apparatus. The projection display comprises a plurality of cathode ray tubes with raster scanned images which are projected on to screen 700. A cabinet C supports and surrounds screen 700 and provides a picture display area 800 which is slightly smaller than the screen. Screen 700 is depicted with a broken line to indicate an edge area which is concealed within cabinet C and which may be illuminated with raster scanned images when operated in an overscan mode as indicated by area OS. Photo sensors S are located adjacent to the periphery of screen 700 within the concealed edge area and outside viewed area 800. However, raster scanned images can also be projected to produce a picture display on a screen or surface which is not suspended within or partially concealed by a cabinet. This method of picture display is known as a front projection display. In a front projection arrangement photo sensors are located as described previously, but in an unconcealed position adjacent to the periphery of screen. Operation of an automatic convergence correction system which will be described is equally applicable to front or back display projection.

Eight sensors are shown in FIG. 1, positioned at the corners and at the centers of the screen edges. With these sensor positions it is possible to measure an electronically generated test pattern, for example video block M, to determine picture width and height and certain geometric errors, for example, rotation, bow, trapezium, pincushion etc., and thereby align the displayed images to be superimposed one with the other over the whole of the screen area. Measurements are performed in both horizontal and vertical directions in each of the three projected color images thus yielding at least forty eight measured values.

Operation of the measurement and alignment system is explained in U.S. Pat. No. 6,392,612 titled Opto Sensor Signal Current Detector which is hereby incorporated by reference. However, in simple terms, three cathode ray tubes, R, G and B form raster scanned monochromatic color images which are directed through individual lens systems to converge and form a single display image 800 on screen 700. Each cathode ray tube is equipped with four coil sets which provide horizontal and vertical deflection and horizontal and vertical convergence. The deflection coil sets are driven with deflection waveform signals that are controlled in amplitude and waveshape and synchronized with the signal source selected for display. Exemplary green channel horizontal and vertical convergence coils are driven with convergence correction waveform signals which may be considered representative of DC and AC convergence signals, for example static and dynamic convergence. However, these functional attributes may be facilitated, for example by modifying all measurement location addresses by the same value or offset to move the complete raster and achieve an apparent static convergence or centering effect. Similarly, a dynamic convergence effect may be produced by modification of the location address of a specific measurement location. Correction waveform signals for the green channel are generated by exemplary digital to analog converters which convert digital values read from memory.

Video display signals RGB, are derived from either a user selected input video selector or from electronically generated video information, for example, menu, or setup signals which may be combined for display by an on screen display generator. During automated sensitivity calibration or convergence alignment, a video generator forms an exemplary calibration video test signal comprising an exemplary black level signal with a monochrome rectangular block M having a predetermined video amplitude value. The video test signal including block M is coupled, for example to a cathode of a specific cathode ray tube and is automatically positioned by determining horizontal and vertical timing within the raster such that when projected, block M illuminates an exemplary sensor S1, as depicted in FIG. 1.

To facilitate adjustment and alignment of the three color images, setup block M is generated as described and coupled in turn to each CRT. In FIG. 1 test pattern block M is shown approaching sensor S1, and as previously mentioned each sensor may be illuminated by the timed generation of the marker block within a video signal projected with an overscanned raster, or by positioning the scanned raster such that marker block M lights sensor S1. Each sensor generates a substantially linear photo generated signal in proportion to the intensity of the incident illumination. However, the intensity of illumination at each individual sensor may vary greatly and in prior automatic set up arrangements each sensor was evaluated for sensitivity in terms of signal output level for each color illumination to ensure that the detected edge of block M is similar for each color. In a prior arrangement alignment of detector sensitivity required about 5 seconds. Furthermore, in addition to detector sensitivity the video level of display marker block M was also capable of setting to a specific value setting for each color to ensure that all sensors could be lit or illuminated.

Subsequent system refinement has shown that detector sensitivity can be set to a fixed, color specific, constant value derived in accordance with the relative phosphor persistence. For example, because the blue phosphor has least persistence and consequently generates the brightest image flashes it thus requires the greatest reduction in detector sensitivity. Conversely, the green phosphor has the longest persistence and flashes dimly and hence requires the greatest detector sensitivity. The red phosphor has a persistence which is between that of the blue and green phosphors and requires a corresponding intermediate detector sensitivity. In addition it has been discovered that marker brightness or marker video level adjustment can provide sufficient compensation range to correct for component aging. This simplification is possible because the alignment system is differential and insensitive to edge detection matching between colors. It is sufficient that the edge detection for each color can be repeated with subsequent measurements.

Figure 2:
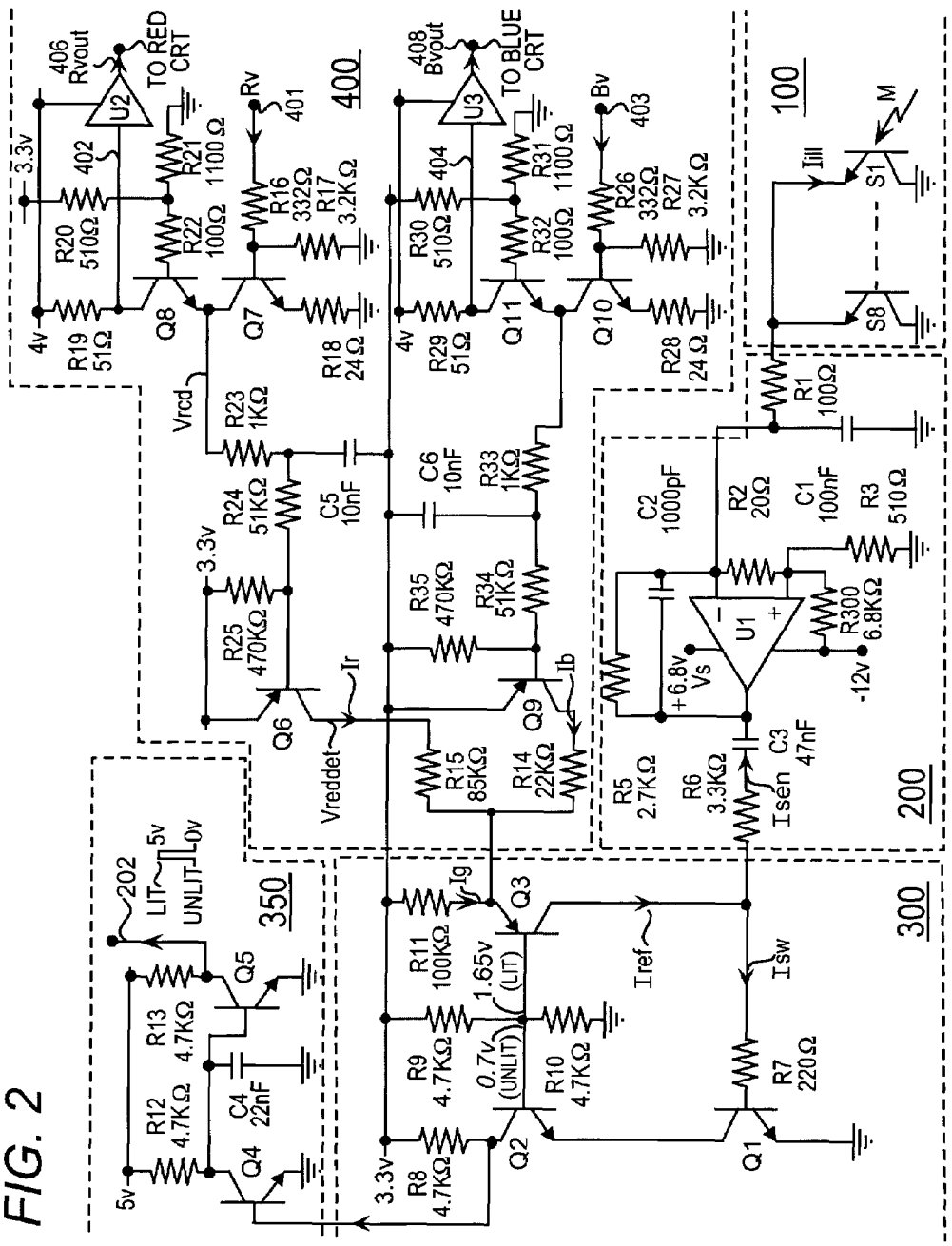
FIG. 2 is a schematic diagram of inventive arrangements for controlling a sensor signal detection threshold in accordance with a projected video image color.

The circuit arrangement of FIG. 2 shows the advantageous sensor signal detector described previously where a predetermined threshold for sensor signal detection is set for each color. In addition the color specific thresholds are automatically selected by the video alignment marker block signal M which is coupled in turn to each cathode ray tube. In FIG. 2 screen periphery sensors S1-S8 are depicted with a parallel connection in dashed block 100. A projected image of video marker block M is illustrated to be incident on sensor S1 which causes a sensor signal Iill to be generated. Sensor signal Iill is coupled to sensor amplifier U1, depicted in block 200, via a low pass fitter formed by series connected resistor R1 and capacitor C1 coupled to signal ground.

A detailed description of sensor amplifier U1 is provided in U.S. patent application Ser. No. 09/657,647. However, in simple terms the use of differential amplifier U1 provides both amplification of the wanted sensor signal Iill with rejection of unwanted crosstalk signal components. Sensor signal Iill is coupled to the inverting input amplifier U1, and also to the non-inverting input via resistor R2. Resistors R3 and R4 form a potential divider from the negative power supply to ground to provide a bias potential to the non-inverting input. A parallel connected arrangement of capacitor C2 and resistor R5 provide feedback from the output of amplifier U1 to the inverting input. The filtered and amplified sensor signal Isen is output from amplifier U1 via capacitor C3 and resistor R6 connected in series.

Detection of the filtered and amplified sensor signal Isen is performed in block 300 which is described in detail in U.S. Pat. No. 6,392,612 which is hereby incorporated by reference. However, in simple terms transistors Q1 and Q2 form a cascode amplifier which is switched between conduction and non-conduction in accordance with the amplitude of the sensor signal Isen from amplifier U1. A signal Iref is generated by transistor Q3 and coupled to the junction of resistor R6 and resistor R7 at the base of transistor Q1. Signal Iref is selected to have a value such as to cause transistor Q1 to be in saturated conduction by signal Isw until sensor signal Isen, from amplifier U1, is of sufficient amplitude to reduce the amplitude of signal Isw and cause transistor Q1 to be non-conductive. Thus, transistor Q1 forms a sensor signal detector with conduction/non-conduction, or sensor signal detection threshold determined by signal Iref from transistor Q3 collector. Furthermore, signal Iref is selectably determined in accordance with video derived control signals formed in block 400 and coupled to transistor Q3 emitter, as will be described.

When no sensors are illuminated by marker M, signal Isw turns on transistor Q1 which in turn causes transistor Q2 to turn on with the collector assuming a nominally ground potential. A detected sensor signal is formed at the collector of transistor Q2 where nominally zero volts indicates an unlit sensor condition and positive voltage equal to the base emitter voltage of transistor Q4 represents a lit sensor. Transistors Q4 and Q5 form a pulse stretching filter which ensures a minimum detected sensor pulse duration of a few microseconds. The detected and stretched sensor signal is output from transistor Q5 collector as signal 202 for coupling to an automation system controller which is not illustrated.

Operation of the circuit arrangement of FIG. 2, block 300 is described in detail in U.S. Pat. No. 6,392,612. However, in simple terms transistors Q1, Q2 and Q3 provide a sensor signal detector with a plurality of selectable detection thresholds which in addition include a predetermined detection turnoff threshold hysteresis. The magnitude of threshold signal Iref is determined by the base to emitter voltage of current source transistor Q3. This in turn is related the value of emitter resistor R11 which couples the emitter of transistor Q3 to a positive supply voltage. In a prior arrangement, control of threshold signal Iref was provided by a digital to analog converter which can be considered to represent a effective impedance coupled in parallel with emitter resistor R11. In this way stored digital threshold values were converted to analog values for coupling to the emitter of the current source transistor to provide individual sensor specific detection threshold values.

Block 400 of FIG. 2 shows an inventive arrangement which facilitates varying detection threshold levels by selectably controlling signals added at the emitter of current source transistor Q3. Furthermore, because the sensor detection threshold can be controlled in accordance with the display color rather than the spatial position of the raster sensor, color specific threshold values are controllably selected by the colored video marker blocks M generated during automated adjustment.

Operation of block 400 is as follows. Part of a digital convergence system generates and positions within the display raster video marker blocks M to illuminate each sensor for each of the projection display colors. In block 400 exemplary red marker M video signal Rv from the digital convergence system is coupled via a potential divider formed by resistor R16 to the base of transistor Q7 with resistor R17 coupled to ground. The emitter of transistor Q7 is coupled to ground via a resistor R18 and transistor Q7 is arranged as the current source portion of a cascode amplifier with transistor Q8. The base of transistor Q8 is supplied via resistor R22 from a potential divider, coupled between a positive supply and ground and formed by resistors R20 and R21. Transistor Q8 forms an amplified signal (402) across resistor R19 which is connected from the collector to an isolated positive supply associated with the red video amplifier U2. The junction of transistor Q7 collector and transistor Q8 emitter is also coupled via a series connected resistor R23 to the junction of a capacitor C5, which is connected to a 3.3 volt positive supply, and a further resistor R25 which is coupled to the base of a PNP transistor Q6. The base of transistor Q6 is also connected to the positive supply via resistor R25. Transistor Q6 is a saturating switch with the emitter connected to the positive supply and the collector sourcing current Ir via resistor R15 to the emitter of reference current source transistor Q3.

Operation of the red marker signal amplifier is as follows. Cascode Transistors Q7, Q8, Q10, Q11 and associated circuitry are configured as cascode video drivers with radio frequency filtering as discussed in U.S. Pat. No. 5,969,762 titled Video Signal Driver Including A Cascode Transistor which is hereby incorporated by reference. The cascode amplifier formed by transistors Q7 and Q8 has a voltage gain of approximately 2 and forms an inverted signal 402 which is coupled via amplifier U2 to the red CRT as red marker block signal M, Rvout (408).

Figure 3A:
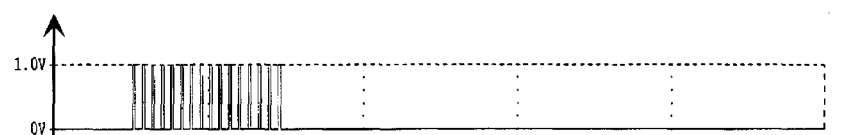
FIGS. 3A-G show waveform signals at various locations within the inventive arrangement shown in FIG. 2.

The actual amplitude of input signal Rv is determined by a 4 bit digital word hence red marker block signal Rv can have amplitude values in a range from 0.0 volts to 1.6 volts with a first step at zero volts and the 15 remaining values arranged evenly in the range 0.6 to 1.6 volts. During time interval t0.0-t0.5 mille seconds, as depicted in FIG. 3A, red marker video signal Rv is at zero volts and transistor Q7 provides no current to transistor Q8. The emitter of transistor Q8 assumes a potential of approximately 3.3V due to a resistive path via resistors R23, R24 and R25. In addition capacitor C5 is discharged to zero volts via resistors R23, R24 and R25. For Example, when an exemplary red marker signal is input having a step size of Vr=0.8 volts, 0.72 volts drives the base of transistor Q7, about 0.12 volts appears across resistor R18. This voltage results in approximately 5.3 mille Amperes flowing in resistor R18 and charging capacitor C5 through resistor R23. When capacitor C5 has charged such that the emitter of transistor Q8 reaches a potential of about 1.65 volts, transistor Q8 turns on clamping further charging of capacitor C5 and diverting the majority of the 5.3 mille Amperes current to resistor R19. This clamping point is determined by the base bias of 2.25V at transistor Q8 base due the divider resistors R20 and R21. A small fraction of the 5.3 mille Amperes current flows through resistor R24 and provides base bias to transistor Q6.

PNP transistor Q6 saturates to near the supply voltage of +3.3 volts and conducts current Ir determined by the value of resistor R15.

The video marker image M is made up of short, aligned, lighted segments comprising a number of adjacent scan lines. When the marker video pulses end, transistors Q7 and Q8 turn off and capacitor C5 slowly discharges through resistor R24 into the base of transistor Q6. However, transistor Q6 remains on for a time long enough to minimize additional capacitor charging from adjacent successive scan lines. This is necessary to limit a loss of contrast, or video amplitude, at the rising edge of the video pulse on the remaining lighted lines. Such a loss can interfere with accurate edge detection as the lighted area is moved across a light sensor. Only the first line of the lighted area M delivers full charging energy to capacitor C5 and thus the marker has a loss in contrast and hence this area of the lighted marker is unused by the automation system.

Transistor Q6 current Ir adds to the current Ig flowing in resistor R11 and flows through transistor Q3 to form current Iref. The sensor current Isen, due to marker M illuminating the sensor, must exceed the increased current Iref in order to deprive transistor Q1 of base bias current Isw and cause the transistor Q1 to switch off thereby indicating a lit sensor. Thus, the threshold for detection of red marker M images detected by detector transistor Q10 is increased by the summation of currents Ir and Ig.

Operation of the blue marker signal amplifier comprising transistors Q9, Q10 and Q11 and blue video amplifier 407 is identical to that of the red amplifier with the exception that resistor R14, from the collector of transistor Q9, sources a current Ib with a magnitude approximately four times that generated responsive to the red marker video signal.

In the absence of both red and blue video signals Rv and By no additional current is summed at the emitter of transistor Q3 and current Iref is substantially equal to Ig, the green detector threshold value.

FIGS. 3A-G show various waveforms helpful in understanding the operation of the inventive arrangements of FIG. 2. Red marker video signal 401, Rv, is depicted in FIG. 3A. Red signal Rv, is divided by resistors R16 and R17 resulting in about 91% signal amplitude being coupled the base of transistor Q7. At the emitter of transistor Q7 and across resistor R18 the divided Rv signal appears minus with one base emitter diode drop producing a current in resistor R18. This current also flows through transistors Q7 and Q8 and resistor R19 causing a voltage across resistor R19 approximately twice that across resistor R18. This voltage, Rvout, drives red video inverting amplifier 406 and the red cathode ray tube (CRT).

Figure 3B:
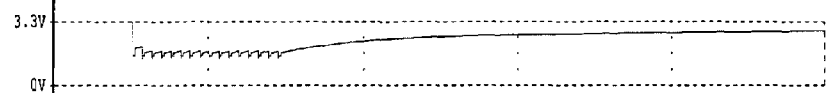
Figure 3C:
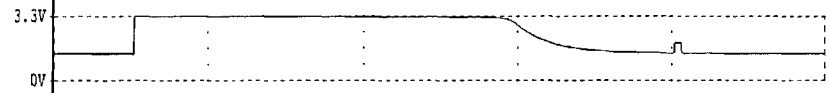

The voltage at the junction of the transistor Q7 collector and the emitter of transistor Q8, Vrcd, (V red color detect) is shown in FIG. 3B. During time interval t0.0-t0.5 mille seconds, red marker video signal Rv is at zero volts, and voltage Vrcd is at 3.3 volts or approaching 3.3 volts due to the discharge of capacitor C5 through resistors R24 and R25 and the base emitter junction of transistor Q6. The base emitter junction of transistor Q8 is reverse biased and transistor Q7 is non conductive. At time interval t0.5-t1.5 mille seconds, red marker pulses of about one volt are coupled to transistor Q7 which turns on causing the baseemitter junction of transistor Q8 to conduct. With transistor Q8 turned on voltage Vrcd is clamped at about 1.65 volts, one base emitter diode drop below a voltage of 2.25 volts determined by divider resistors R20 and R21. Voltage Vrcd is applied via resistor R23 and charges capacitor C5 away from the supply voltage to a voltage of, 3.3 volts minus 1.65 volts. This capacitor voltage is coupled via resistor R24 to the base of PNP switching transistor Q6 causing it to conduct and saturate such that the collector voltage is substantially at the supply voltage of 3.3 volts, shown as voltage Vreddet, (V red detected) in FIG. 3C.

Figure 3D:
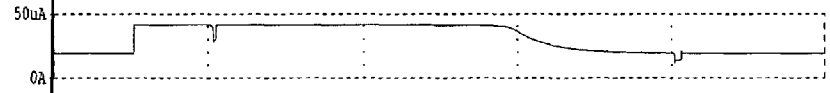

FIG. 3D shows threshold current Iref from the collector of current source transistor Q3. As explained previously current Iref is determined by the sum of currents flowing in resistors R11, Ig; R15, Ir, and R14, Ib. A green threshold current Ig is always present and determines threshold current Iref for green image measurements. Red and blue threshold currents Ir or Ib respectively are added to current Ig by the switching action of transistors Q6 or Q9 which are driven by respective red and blue marker video signals, Vr, Vb.

Figure 3E:
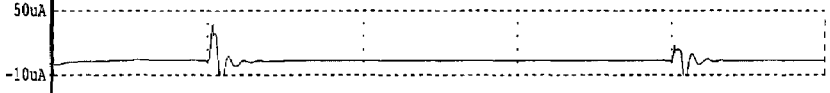
Figure 3F:
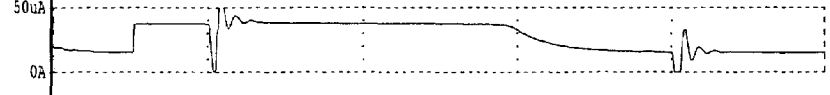
Figure 3G:
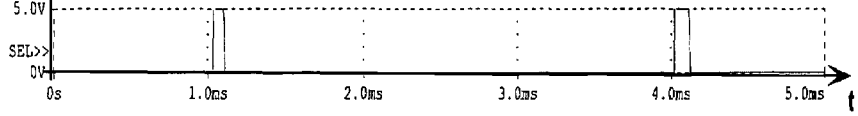

Threshold current Iref is shown FIG. 3D and during time interval t0.0-t0.5 mine seconds is initially equal to Ig. At time interval t0.5 mille seconds a red video signal is generated and turns on transistor Q6 and increases threshold current Iref to by red threshold current Ir. FIG. 3E shows current Isen which is determined by photo induced current in any of light sensors S1 . . . S8. The sensor signal is amplified and converted to a voltage by amplifier U1 and AC coupled via capacitor C3 to appear across resistor R6. The base current driving light detecting switch transistor Q1, Isw, is shown in FIG. 3F. Base current Isw is the sum of Iref and Isen. In FIG. 3E at about 1 mine second a marker M illuminates a sensor and current Isen momentarily exceeds threshold current Iref which causes current Isw to go to zero and turnoff transistor Q1. Current Iref then flows via resistor R6 to charge capacitor C3. Positive feedback is used to slow the charging of capacitor C3. The marker light pulse is effectively stretched by biasing changes at the base of transistor Q3 which reduces threshold currents Ig, Ir and Ib by about ⅓ thereby providing detector hysteresis. After about 4 mine seconds a second sensor is lit and detected due to a green marker image. Note that the voltage Vreddet of FIG. 3C has returned to its initial level, the value of current Iref of FIG. 3D has returned to its initial level and that during light pulse M current Iref is decreased by ⅓. FIG. 3G, shows the light detection pulse V202 that is supplied to the microcomputer to facilitate automatic adjustment.

What is claimed is:

1. A method for setting opto-sensor detection sensitivity in a projection video display comprising the steps of:
    a) sequentially generating video signals of different colors for illuminating a sensor with video images of said video signals;
    b) automatically selecting respective detection thresholds responsive to said video signals, wherein said selecting step comprises the steps of activating for each said video signal a specific threshold value for detecting sensor signals and sustaining said selected threshold value for a time interval following cessation of said generating step;
    c) sequentially detecting sensor signals in excess of said respective detection thresholds; and,
    d) coupling said detected sensor signals for automated adjustment of said projection video display.

2. The method of claim 1, wherein said selecting step comprises processing each said video signal to select a color specific detection threshold value.

3. A method for setting opto-sensor detection sensitivity in a projection video display comprising the steps of;
    a) sequentially generating a plurality of video signals comprising a first color video signal, a second color video signal, and a third color video signal for illuminating a sensor with video images of said plurality of video signals;
    b) automatically selecting respective detection thresholds responsive to said plurality of video signals, wherein said selecting step comprises activating for each said video signal a specific threshold value for detecting sensor signals;
    c) sequentially detecting sensor signals in excess of said respective detection thresholds; and,
    d) coupling said detected sensor signals for automated adjustment of said projection video display;
wherein said activating step comprises selecting a detection threshold value for said third color video signal during an absence of said first color video signals and said second color video signal.

4. A video amplifier for a display device, comprising:
    first and second transistors configured as a cascade amplifier coupled to said display device and responsive to a video signal;
    a time constant network coupled to said first and second transistors for developing a control voltage responsive to said video signal; and
    a third transistor responsive to said control voltage and being switched between conduction and non-conduction responsive to a presence and absence of said video signal.

5. The video amplifier of claim 4, wherein said third transistor is conductive when said video signal is present in said cascode amplifier.

6. The video amplifier of claim 4, wherein said third transistor remains conductive during a predetermined interval upon cessation of said video signal in said cascade amplifier.

7. The video amplifier of claim 4, wherein said time constant network has different charging and discharging times.

8. The video amplifier of claim 4, wherein said third transistor generates a predetermined constant current responsive to said video signal presence.

9. A projection display device with automated adjustment using at least one photo sensor, comprising:
    a source of video signal generating an image for illuminating said photo-sensor and forming a photo sensor signal;
    a detector coupled to said photo sensor and generating an output signal responsive to said photo sensor signal shaving a certain signal value; and,
    a threshold generator responsive to said video signal for setting a detection threshold for said detector,
    wherein, said detector generates an output signal for said automated adjustment when said photo sensor signal value exceeds said detection threshold generated responsive to said video signal, and absent said video signal said threshold generator assumes a second detection threshold in accordance with a second video signal; and
wherein said video signal forming said image for illuminating said photo sensor represents a marker block positioned within a raster to illuminate said photo sensor when said image is projected.

10. The projection display device of claim 9, wherein said video signal coupled for automated alignment represents a specific colored image.

11. A projection display device with an automated adjustment using at least one photo sensor, comprising:

a source of video signal generating an image for illuminating said photo sensor and forming a photo sensor signal;
a detector coupled to said sensor and generating an output signal responsive to said photo sensor signal shaving a certain signal value; and,
a threshold generator responsive to said video signal for setting a detection threshold for said detector,
wherein, said detector generates an output signal for said automated adjustment when said sensor signal value exceeds said detection threshold generated responsive to said video signal, and absent said video signal said threshold generator assumes a second detection threshold in accordance with a second video signal; and wherein said threshold signal value enables detection of said photo sensor signal when illuminated by a colored image formed by said video signal.

* * * * *